United States Patent
Tokoi et al.

(10) Patent No.: US 8,206,867 B2
(45) Date of Patent: Jun. 26, 2012

(54) FUEL CELL

(75) Inventors: Hiromi Tokoi, Tokai (JP); Nariyoshi Kobayashi, Hitachinaka (JP); Kazuo Takahashi, Hitachiota (JP); Tadashi Yoshida, Hitachi (JP); Akihiko Noie, Hitachinaka (JP); Shin Takahashi, Hitachi (JP); Akira Gunji, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 1371 days.

(21) Appl. No.: 11/657,691

(22) Filed: Jan. 25, 2007

(65) Prior Publication Data
US 2008/0008922 A1 Jan. 10, 2008

(30) Foreign Application Priority Data
Jul. 5, 2006 (JP) .................................. 2006-185074

(51) Int. Cl.
*H01M 8/10* (2006.01)

(52) U.S. Cl. ........................................ 429/443; 429/513

(58) Field of Classification Search .................... 429/34, 429/35, 37, 38, 12, 443, 513, 522
See application file for complete search history.

(56) References Cited

U.S. PATENT DOCUMENTS

| 4,894,297 A * | 1/1990 | Singh et al. ............... 429/31 |
| 6,766,817 B2 | 7/2004 | de Silva |
| 6,918,404 B2 | 7/2005 | de Silva |
| 7,066,586 B2 | 6/2006 | de Silva |
| 7,285,355 B2 | 10/2007 | Kadlec et al. |

FOREIGN PATENT DOCUMENTS

JP 2005-166527 6/2005

OTHER PUBLICATIONS

Email from Elson Silva, dated Apr. 23, 2008, subject IDS request for US 20080008922.

* cited by examiner

*Primary Examiner* — Jennifer Michener
*Assistant Examiner* — Monique Wills
(74) *Attorney, Agent, or Firm* — Antonelli, Terry, Stout & Kraus, LLP.

(57) ABSTRACT

A flat tube double-sided power generation type fuel cell is comprised of the combination of one or more of the following means (1) and (2). That is,
means (1) for optimizing the constitution of an current-collecting electrode thereby making the flow of fuel or air uniform over the entire region, and
means (2) for dividing the current-collecting electrode into two regions thereby shunting the flow of the fuel into a flow directing to the anode of the cell and a flow directly directing to the downstream, for increasing the power generation amount in the cell, the means being applicable also to a cell of a cylindrical shape.

10 Claims, 6 Drawing Sheets

FUEL CELL

CLAIM OF PRIORITY

The present application claims priority from Japanese application serial no. 2006-185074, filed on Jul. 5, 2006, the content of which is hereby incorporated by reference into this application.

BACKGROUND OF THE INVENTION

The present invention relates to a solid oxide fuel cell.

A fuel cell is a power generation device having an anode (fuel electrode) and a cathode (air electrode) on both sides of an electrolyte, wherein a fuel gas is fed to the anode while an oxidizing agent gas is fed to the cathode to generate electricity by reacting the fuel and the oxidizing agent electrochemically by way of the electrolyte. A solid oxide fuel cell as a sort of fuel cells not only has high power generation efficiently but also is operated at a high temperature of from 600 to 1,000° C. Accordingly, as it is possible to reform the fuel in the fuel cell, the solid oxide fuel cell can increase the variety of fuel to be used. Furthermore, it can simplify the fuel system structure. Accordingly, it has an advantage of reducing the cost compared with other fuel cells. Naturally, since the exhaust is at a high temperature, it can be utilized easily and has a feature capable of easily forming not only heat-electricity combined system but also a hybrid system with other systems such as a gas turbine.

The fuel cell is generally classified into a cylindrical type and a plate type depending on the shape of a solid electrolyte. The cylindrical type is more resistant to thermal stresses compared with the plate type, and this is a remarkable advantage for SOFC which is operated at a high temperature.

However, the cylindrical type generally has a higher internal resistance compared with the plate type. One of the causes of high internal resistance is due to a long current path in the cylindrical cell. Further, it since also undergoes restriction upon connection of between unit cells, it has a problem that it is difficult to increase the volumic energy density. For overcoming such problems, it has been proposed for the improvement of making the cell-shape into flat tube-form (refer to JP-A No. 2005-166527).

In the cell described in the above-mentioned patent publication, inter connectors for taking out a current from cells takes up one-half surface of the cells because of serial and parallel connection of cells. Accordingly since the power generation area is decreased, so that the amount of power generation per unit cell can not be increased sufficiently. Accordingly, the volumic energy density can not also be increased sufficiently.

Then, in order to increase the power generation area, it may be considered a cell structure of providing a porous current-collecting electrode at the periphery of the anode making it possible to generate power on both surfaces of a flat tube cell.

However, in the cell provided with the porous current-collecting electrode, the current-collecting electrode becomes a bar for the supply of fuel or air to the cell surface, and it makes difficult to bring fuel or air up to the downstream of the cell. As a result, the electrode current cannot distribute uniformly on the downstream side (for example, in the axial direction), thereby the power generation efficiency is lowered.

SUMMARY OF THE INVENTION

The present invention intends to decrease the lowering of the power generation efficiency, even in a case of using a current-collecting electrode, by feeding the fuel to the cell surface as much as uniform across the entire cell region (for example, uniform in the axial direction).

The invention provides a fuel cell having the following structure.

The fuel cell comprises an anode for oxidizing a fuel, a cathode for reducing an oxidizing agent, an ion permeable electrolyte formed between the anode and the cathode, a porous conductive fuel feeding layer adjacent to the anode, and a fuel transport means for transporting the fuel to the fuel feeding layer.

According to the invention, by making the fuel feeding to the cell as uniform as possible in the axial direction, lowering of the power generation efficiency can be decreased even in a case of using an current-collecting electrode.

DETAILED DESCRIPTION OF THE PREFERRED EMBODIMENTS

In an embodiment according to the invention, a combination of the following means (1) and (2) is proposed. That is, a flat tube type fuel cell comprises:

means (1) for optimizing the constitution of an current-collecting electrode thereby making the flow distribution of a fuel or air uniform across the entire cell region, and means (2) for shunting the flow of the fuel into a flow directing toward the anode of the cell and a flow directly directing toward the downstream of the current-collecting electrode. Further, such a structure is applicable also to a cell of a cylindrical shape.

Figure 1:
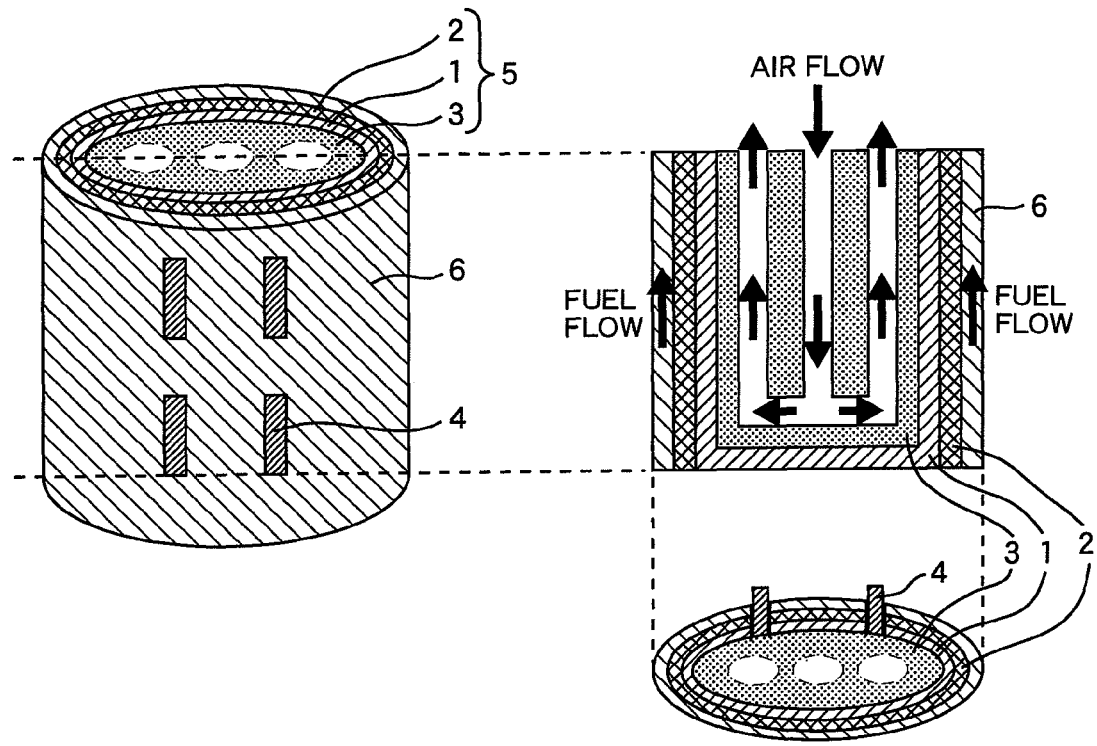
FIG. 1 is a schematic view of a flat tube double-sided power generation type cell.

FIG. 1 shows a schematic view of a flat tube double-sided power generation type cell. A cell 5 comprises a solid electrolyte 1, an anode 2 (fuel electrode) formed on an outer surface of the solid electrolyte 1, a cathode 3 (air electrode) formed on an inner surface of the solid electrolyte 1, and an interconnector 4 for taking out a current from the cathode 3. A current-collecting electrode 6 is provided around the cell 5.

A current of the cell 5 flows from the anode 2 to the cathode 3 by way of the solid electrolyte 1. Further, it flows from the cathode 3 to the interconnector 4 for taking out the current. Since most of the current of the anode 2 flows in the circumferential direction, the current path is increased. In order to prevent the increased current path from becoming a large resistor factor, the current-collecting electrode 6 serves to increase a cross-sectional area of the current path in an auxiliary manner. Incidentally also in the cathode, a current path in the circumferential direction is present although it is not so larger in the anode 2. An air-feeding hole 7 is formed inside of the cathode 3 to feed air as an oxidizing agent, and thereby air region through which air flows is formed. On the other hand, the fuel flows along an outer circumference of the cell 5 to form a fuel region.

While the description for FIG. 1 shows a case of a cell in which the anode is formed on the outer side of the flat tube type, a similar phenomenon as to the current path occurs also even in the case of a cell where the cathode is formed on the outside of the flat tube type. The following description is to be made to a case where the anode is formed on the outside of the cell, and it is specified to an anode of the flat tube double-sided power generation type cell.

In the fuel cell of the present invention, the flow of the fuel in the current-collecting electrode of the flat tube cell is shunted into a flow toward the cell and a flow directly flowing to the downstream of the fuel (in the direction of exit). In addition, the thickness of the anode electrode is decreased to provide the current-collecting electrode with a role of the anode electrode to thereby increase the power generation amount of the cell.

Figure 2:
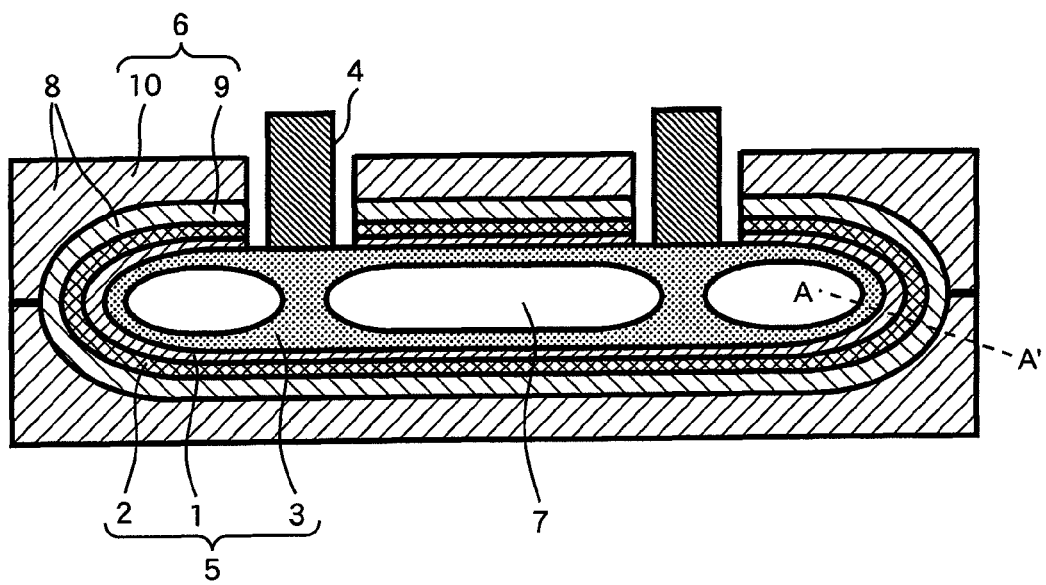
FIG. 2 is a view showing a cross section of the fuel cell of an embodiment according to the invention.

FIG. 2 shows a cross sectional view of a flat tube double-sided power generation type cell as an example of the present invention. An anode (fuel electrode) 2 is formed on the outer surface of the solid electrolyte 1, and a cathode (air electrode) 3 is formed on the inner surface of the same 1, and interconnectors 4 for taking out the current of the cathode are disposed at two positions in the outer surface of the cell. The anode 2 is disposed between the interconnectors 4 provided at two positions in the same manner as portions in the cell.

The solid electrolyte 1 is in a flat tube shape with a bottom, and its material is yttrium stabilized zirconia (YSZ). The anode 2 is made of a porous cermet (sintered body of a metal ceramic) comprising nickel and YSZ. The cathode 3 is made of lanthanum manganate. The interconnectors 4 are made of a lanthanum chlomide. The fuel flows through the outside of the cell. The oxidizing agent (air) flows through air feeding holes 7 at three positions inside the cathode.

The current-collecting electrode 6 is filled in a fuel region 8 on the outside of the cell through which the fuel flows. The current-collecting electrode 6 is comprised of an inner current-collecting electrode 9 adjacent to the anode and an outer current-collecting electrode 10 placed outside the inner current-collecting electrode 9.

Figure 3:
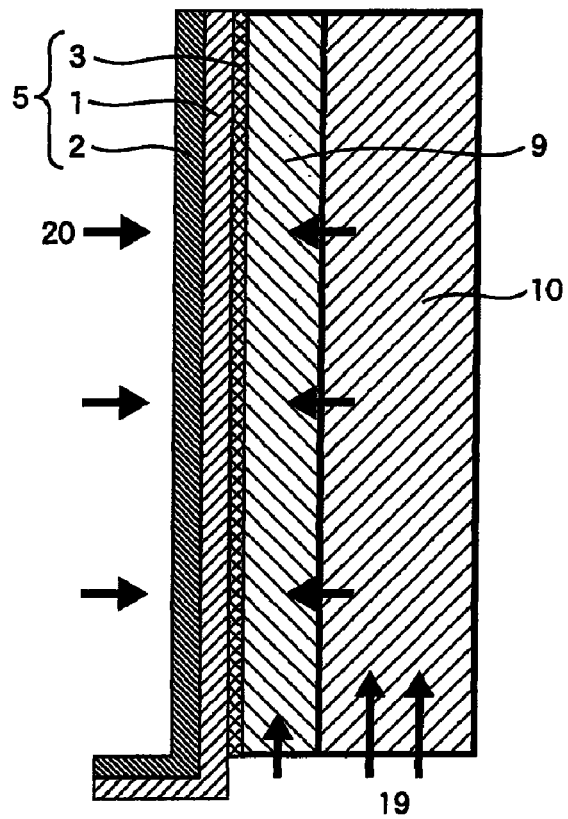
FIG. 3 is a view showing a longitudinal cross section of the fuel cell of the embodiment according to the invention.

FIG. 3 shows a portion of a longitudinal cross section of the flat tube double-sided power generation type cell as an embodiment of the invention. FIG. 3 shows the state of a flow of the fuel 19. The size of arrows schematically shows the level of the flow rate. That is, the flow rate is comparatively higher in the outer current-collecting electrode 10 and the flow rate is comparatively lower in the inner current-collecting electrode 9. The fuel 19 in the outer current-collecting electrode 10 does not have cell reaction in the lower portion and flows to the upper portion of the cell at the downstream. That is, the fuel not having the cell reaction (not used fuel) can be fed as far as the upper portion of the cell (downstream) and the cell reaction occurs uniformly over the entire surface of the cell 5.

The outer current-collecting electrode 10 mainly constitutes a flow path for feeding the fuel in the axial direction of the cell. Further, the outer current-collecting electrode 10 also functions as a current path. Accordingly, the conditions required for the outer current-collecting electrode 10 are preferably as follows. That is, (1) the fuel gas can flow more easily compared with that in the inner current-collecting electrode 9 (with low flow resistance); and (2) the electro-conductivity is high.

The inner current-collecting electrode 9 mainly has a role of transporting the fuel fed to the outer current-collecting electrode 10 into the anode 2. Further, the inner current-collecting electrode 9 functions also as a current path. Accordingly, the conditions required for the inner current-collecting electrode 9 are preferably as follows. That is, (1) the fuel gas is fed from the outer current-collecting electrode 10 and (2) the electro-conductivity is high.

For the inner current-collecting electrode 9 and the outer current-collecting electrode 10, a porous member having through pores, for example, a three-dimensional mesh porous member can be used. The gas flow rate V in the porous member can be represented by the following equation.

$$V = \epsilon_0^3 D^2 \Delta P / \{80\mu(1-\epsilon_0)^2\} l \qquad (1)$$

in the equation, $\epsilon_0$ represents a porosity, D represents a diameter of strand constituting the porous member, l represents the length of a porous layer, $\Delta P$ represents a differential pressure between the upstream and the downstream of the porous layer, and $\mu$ represents the viscosity of a flood. Accordingly, the flow rate increases more as the porosity is larger and the strand diameter constituting the porous member is larger assuming that the differential pressure on the porous layer with a length of l is identical. Naturally, the flow resistance increases more as the porosity is smaller and the wire diameter is smaller.

It is preferable that the gas flows more easily in the outer current-collecting electrode 10 compared with the inner current-collecting electrode 9 and it is preferable to flow at a fast flow rate. The outer current-collecting electrode 10 used in this case had a porosity of about 95% and the strand diameter of about 10 µm. On the other hand, for the inner current-collecting electrode 9, those having a porosity of about 90% and a strand diameter of about 10 µm was used. This can make the flow rate in the outer current-collecting electrode 10 higher by about one digit compared with the flow rate in the inner current-collecting electrode 9. Naturally, it is not necessary to provide a difference between the flow rate in the outer current-collecting electrode 10 and the flow rate in the inner current-collecting electrode 9 by so much as described above, and it may suffice that the difference of the flow rate may be at least about from 1.2 to 1.5.

As a material for the inner current-collecting electrode 9 and the outer current-collecting electrode 10, it is preferable that the electroconductivity is high as shown by the required condition (2) above. Then, a nickel material was used both for the inner current-collecting electrode 9 and the outer current-collecting electrode 10. Nickel was used as a three-dimensional mesh porous member. It may also be a stainless steel, nickel-based alloy, etc.

Further, for the outer current-collecting electrode 10 having a main purpose of flowing the gas, a ceramic material may also be used not being restricted to metal materials. Naturally, in a case of using a highly conductive material for the outer current-collecting electrode 10, the current path is enlarged, thereby contributing to the lowering of the internal resistance.

The cell reaction is shown here. At first, a method of reforming a hydrocarbon type fuel to form a reformed gas containing hydrogen is to be described in the case of methane as example of the hydrocarbon type fuel. On the reforming catalyst, methane and steams are reacted (reforming reaction) to generate hydrogen mainly according to the reaction of the following formula (1). As the reforming catalyst, catalysts such as Ni and Ru systems are used generally.

$$CH_4 + H_2O = CO + 3H_2 \qquad (1)$$

Simultaneously, CO reacted according to the chemical formula (1) is further converted into hydrogen as a fuel by the reaction with $H_2O$ represented by the following formula (2) (CO conversion reaction).

$$CO + H_2O = CO_2 + H_2 \qquad (2)$$

Since the reaction of forming hydrogen from a hydrocarbon type fuel is an endothermic reaction, heat has to be supplied for keeping the reaction and, generally, the reforming catalyst has to be kept at about 600 to 800° C.

The cell reaction (power generating reaction) occurs at the anode 2, which is an exothermic reaction represented by the following formulae (3) and (4):

$$H_2 + \tfrac{1}{2}O_2 = H_2O \qquad (3)$$

$$CO + \tfrac{1}{2}O_2 = CO_2 \qquad (4)$$

Figure 4:
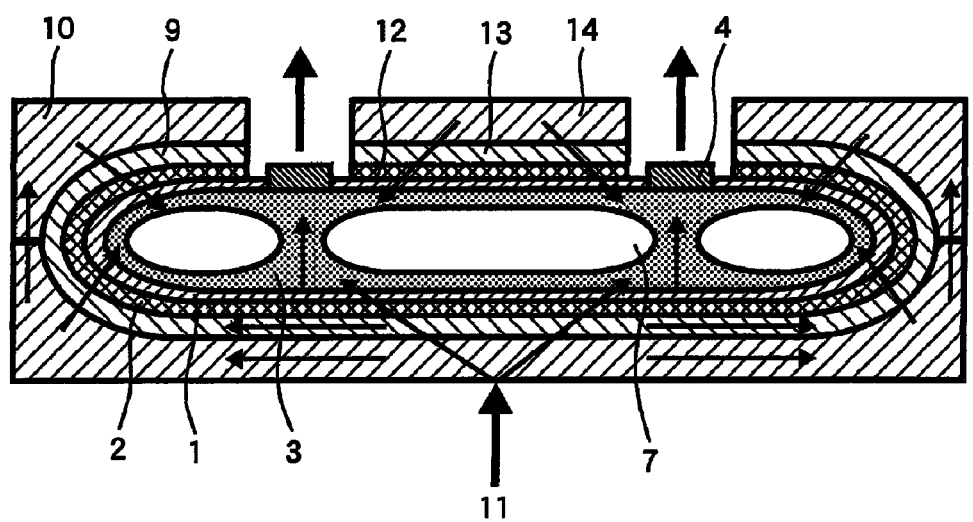
FIG. 4 is a cross sectional view showing a current path in FIG. 1 of the embodiment of the invention.
Figure 5:
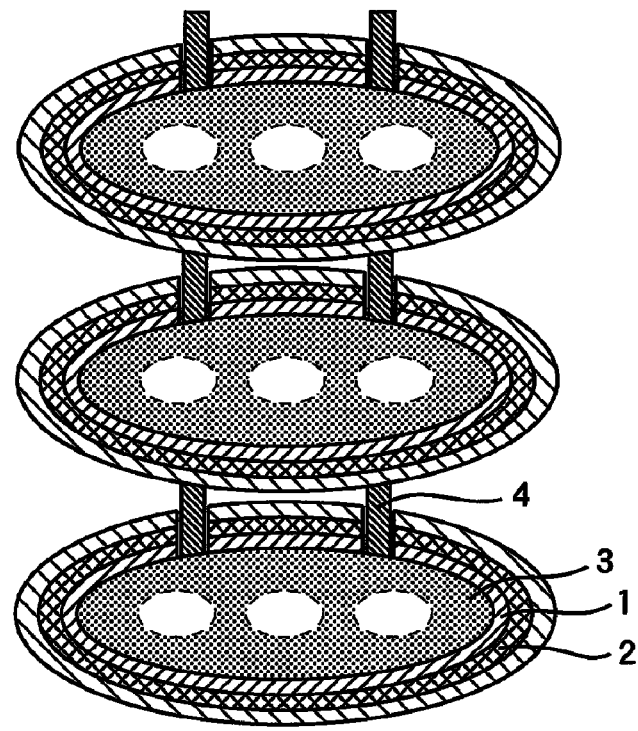
FIG. 5 is a schematic view of an example according to the invention.

A current in the cell of this embodiment is schematically shown in FIG. 4. The current path is indicated by arrows 11. The current of the cell passes from the outer current-collecting electrode 10 to the inner current-collecting electrode 9, flows by way of an anode 2 and a solid electrolyte 1 into a cathode 3 and, further, flows from the cathode 3 to interconnectors 4 and is then taken out to the outside. Further, the current from the outer current-collecting electrode 14 and the inner current-collecting electrode 13 disposed between the two interconnectors, and from the anode 12 also flows through the similar path to the inter connectors 4 and is then taken out to the outside. Further, the anode 2 and the outer current-collecting electrode 14 are electrically connected at the respective adjacent cells as shown in FIG. 5.

In this embodiment, the interconnector 4 is circumferentially divided at two positions and also divided longitudinally at two positions but it may be divided at three or more portions with no problem.

Figure 6:
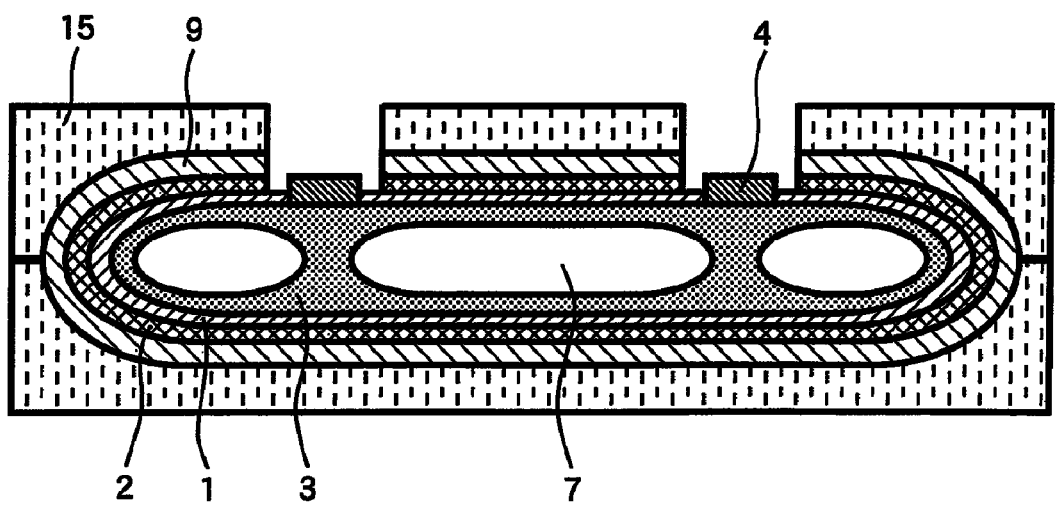
FIG. 6 is a cross sectional view showing a modified example of the invention.

FIG. 6 shows a modified example of this embodiment. A ceramic porous member that can be insulated electrically is used as the outer current-collecting electrode 15 in FIG. 1. In a case of using the ceramic porous member that can be insulated electrically for the outer current-collecting electrode 15, since electrical connection with the anode of an adjacent cell can be avoided upon serial connection of the cells, this is extremely effective in a case of connecting a plurality of cells in series or parallel.

Figure 7:
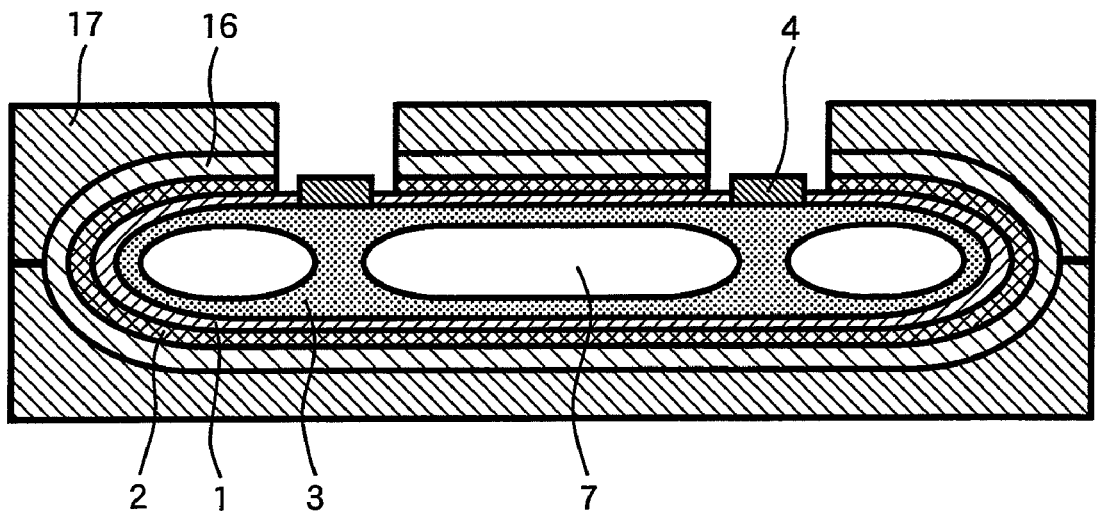
FIG. 7 is a cross sectional view showing a modified example of the invention.

FIG. 7 shows a modified example of this embodiment. A metal mesh or ceramic mesh that can be insulated electrically is used as the outer current-collecting electrode 17 of FIG. 1. A same metal mesh was used also for the inner current-collecting electrode 16.

For the mesh size, a coarse mesh of about #30 was used for the outer current-collecting electrode 17 and a fine mesh of about #100 was used for the inner current-collecting electrode 16.

Figure 8:
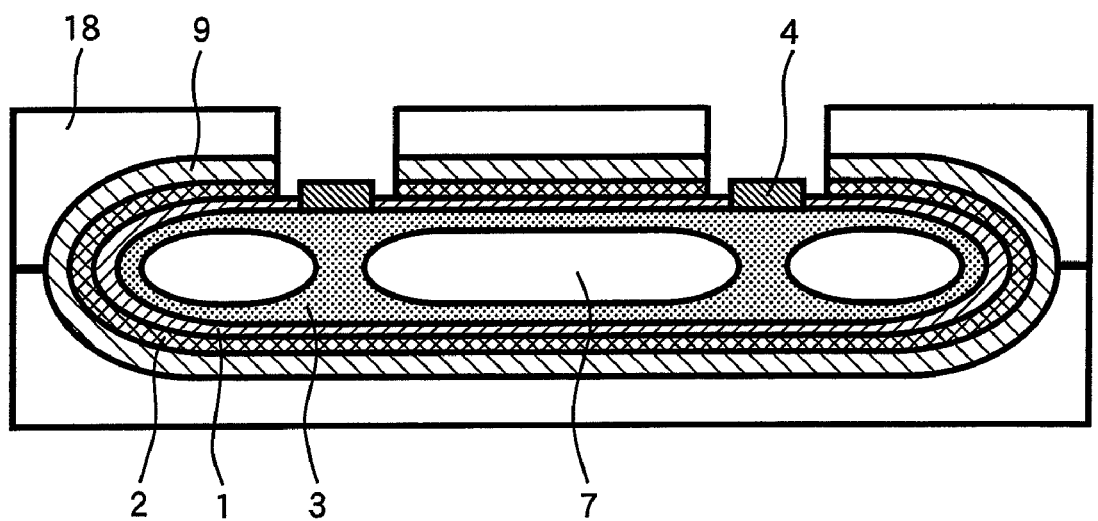
FIG. 8 is a cross sectional view showing a modified example of the invention.

FIG. 8 shows a modified example of the invention. The outer current-collecting electrode in FIG. 1 was removed to provide a fuel feed area 18. While the flow resistance is decreased but the electric resistance increases compared with FIG. 1.

Figure 9:
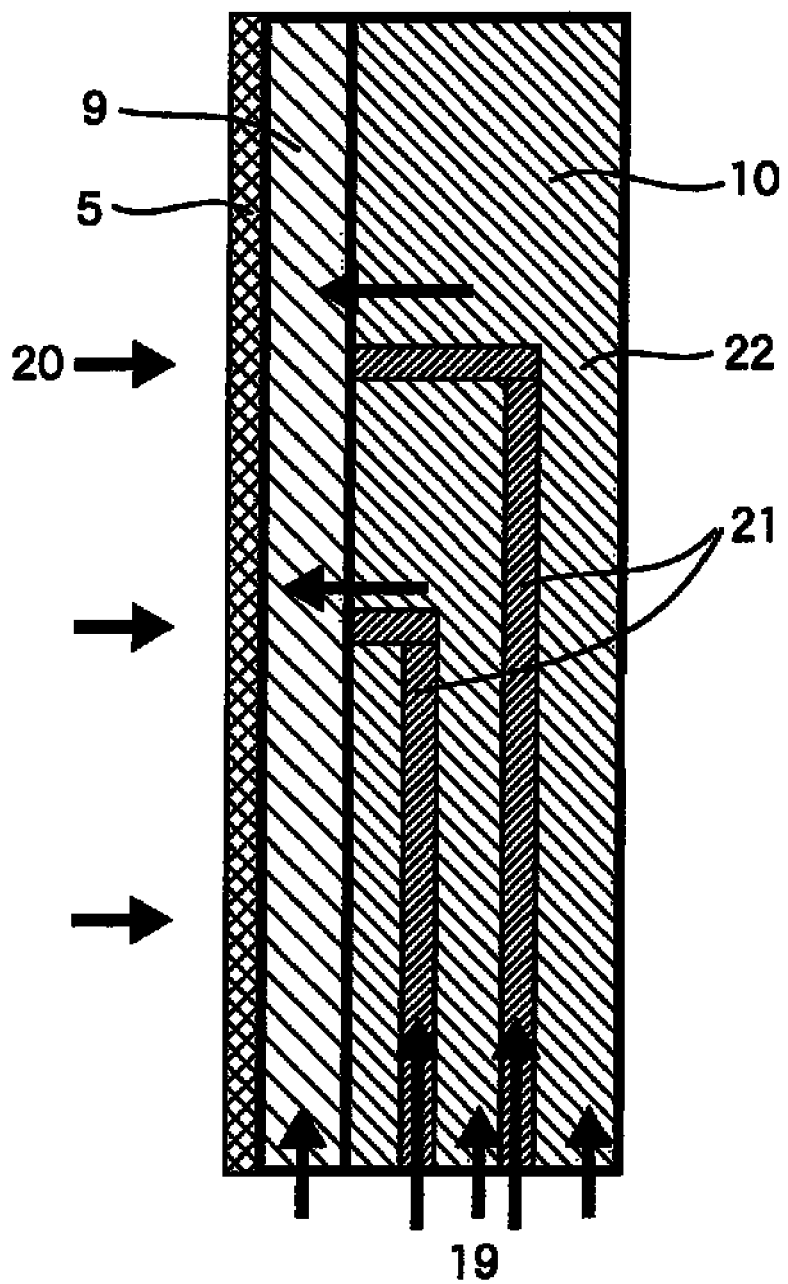
FIG. 9 is a longitudinal sectional view showing a modified example of the invention.
Figure 11:
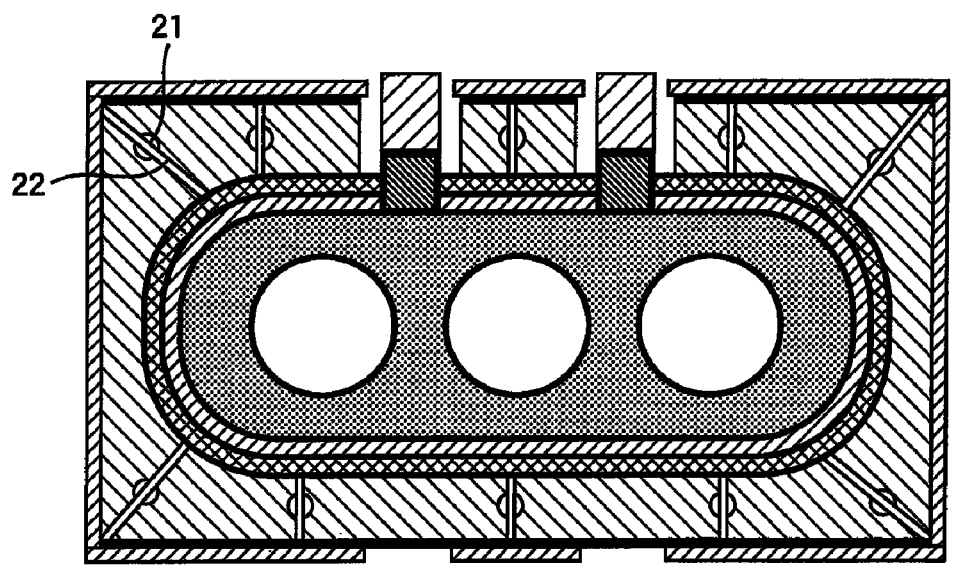
FIG. 11 is a cross sectional view showing a modified example of the invention.

FIG. 9 shows a modified example of the invention. The illustrated example has fuel-feeding holes 21 and anode-side fuel-feeding holes 22 as the fuel gas flow channels in the outer current-collecting electrode 10 and the inner current-collecting electrode 9. The fuel-feeding holes 21 serve to flow the fuel gas mainly in the axial direction of the cell, while the anode-side fuel-feeding holes 22 serves to flow the fuel gas in the radial direction of the cell. Provision of the flow channels enables to feed the unused fuel furthermore to the downstream by which the fuel is fed to the entire surface of the cell 5 making the cell reaction uniform. FIG. 11 shows a cross sectional view of this embodiment.

Figure 10:
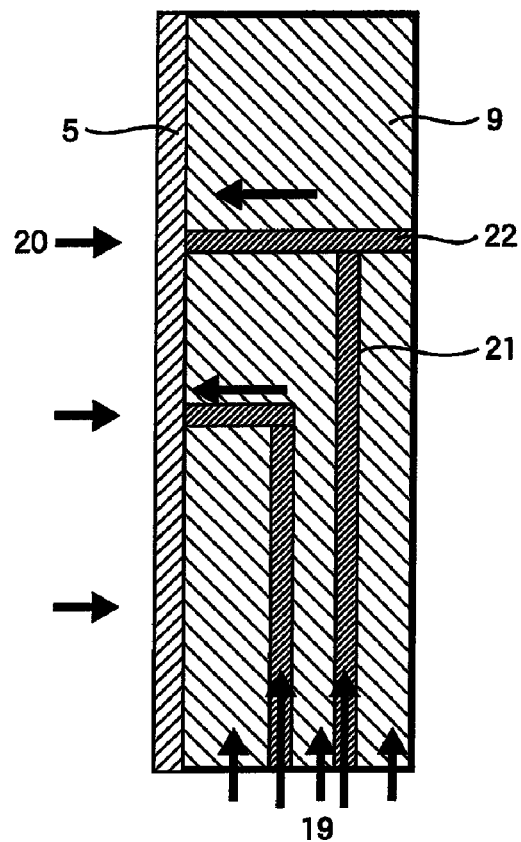
FIG. 10 is a longitudinal sectional view showing a modified example of the invention.

FIG. 10 shows a modified example of this embodiment. In the illustrated example, fuel-feeding holes 21 and anode-side fuel-feeding holes 22 as gas flow channels are disposed in the inner current-collecting electrode 9. The fuel-feeding holes 21 serve to flow the fuel gas mainly in the axial direction of the cell, while the anode-side fuel-feeding holes 22 serve to flow the fuel gas in the radial direction of the cell. Provision of the flow channels enables to feed the unused fuel further to the downstream and the fuel is fed to the entire surface of the cell 5 to make the cell reaction uniform. Since such fuel gas feeding channels can be also used for the axial feeding of the fuel gas, the outer current-collecting electrode 10 was removed. This can reduce the internal resistance.

While the embodiment has been described with reference to a cell structure in which the outside of the flat tube double-sided power generation type cell is provided the anode, the present invention can provide the same effect also in the cell structure in which the outside of the flat tube double-sided power generation type cell is provided with the cathode.

While the embodiment has been described with reference to the examples in which the tubular shape with a bottom for the fuel cell is adapted for the flat tube shape, the effect is not impaired at all also in an flat tube with bottomless.

Further, since the cell shape is not restricted to the flat tube shape but the invention is applicable also to a cell of an oval shape in cross section or a cell of a cuboidal, rectangular or cylindrical shape with similar effect, the shape is not restricted to the flat tube shape.

In the fuel cell of this embodiment, since substantially the entire region of the flat tube cell contributes to the cell reaction and the area of power generation can be increased to increase the amount of power generation and the internal resistance can be decreased, the energy efficiency can be improved. In this case, the cell performance can further be improved by providing the current-collecting electrode not only to the anode but also to the cathode.

What is claimed is:

1. A fuel cell of a flat tube shape, a cuboidal shape, or a cylindrical shape comprising:
   an electrolyte;
   an outer electrode provided on an outer surface of the electrolyte to serve as one of an anode and a cathode;
   an inner electrode provided on an inner surface of the electrolyte to serve as another of the anode and the cathode;
   a current-collecting electrode made of conductive and porous material provided around substantially all of an outer circumference of the outer electrode to serve as an auxiliary current path for the outer electrode thereby to substantially increase a cross-sectional area of a current path in a circumferential direction of the outer electrode, wherein the current collecting electrode is provided with a fluid feeding channel for feeding a fluid as a fuel or an oxidizing agent at a uniform concentration to the entire region of the outer electrode by shunting flow of the fluid into a flow of the fluid directed to the outer electrode and a flow of the fluid directed in an axial direction of the cell.

2. A fuel cell according to claim 1,
wherein the current-collecting electrode on the fuel cell is divided into at least two layers comprising an inner current-collecting electrode adjacent to the outer electrode and an outer current-collecting electrode provided outside the inner current-collecting electrode, and
wherein the flow resistance of the inner current-collecting electrode is made larger than the flow resistance of the outer current-collecting electrode and thereby, the flow of the fluid is shunted into the flow directed in the axial direction through the outer current-collecting electrode and the flow directed to the outer electrode through the inner current-collecting electrode.

3. A fuel cell according to claim 1,
wherein the current-collecting electrode on the fuel cell is divided into at least two layers comprising an inner current-collecting electrode adjacent to the outer electrode and an outer current-collecting electrode provided outside the inner current-collecting electrode, and
wherein a flow rate in the inner current-collecting electrode is restricted not to be greater than a flow rate in outer current-collecting electrode, and thereby, the flow of the fluid is shunted into the flow directed in the axial direction through the outer current-collecting electrode and the flow directed to the outer electrode through the inner current-collecting electrode.

4. A fuel cell according to claim 1,
wherein the current-collecting electrode on the fuel cell is divided into at least two layers comprising an inner current-collecting electrode adjacent to the outer electrode and an outer current-collecting electrode provided outside the inner current-collecting electrode, and
wherein the inner current-collecting electrode and the outer current-collecting electrode are made of porous, mesh or wick members having through pores of mutually different porosities so that the flow of the fluid is shunted into the flow directed in the axial direction through the outer current-collecting electrode and the flow directed to the outer electrode through the inner current-collecting electrode.

5. A fuel cell according to claim 1,
wherein the outer electrode serves as the anode and the current-collecting electrode is made of a porous member containing nickel.

6. A fuel cell according to claim 1,
wherein an outer part of the current-collecting electrode is made of a ceramic porous member.

7. A fuel cell according to claim 1,
wherein the outer electrode serves as the cathode and the current-collecting electrode is made of a porous member containing chromium.

8. Fuel cells connected to each other in series or in parallel through an inter connector, wherein each of them is configured by the fuel cell according to anyone of claims 2, 3, 4, 5, 6, and 7.

9. A fuel cell according to claim 1,
wherein the current-collecting electrode is divided into at least two layers comprising an inner current-collecting electrode adjacent to the outer electrode and an outer current-collecting electrode provided outside the inner current-collecting electrode, and
wherein a flow rate in the inner current-collecting electrode is restricted to about 0.8 times or less of a flow rate in outer current-collecting electrode, and thereby, the flow of the fluid is shunted into the flow directed in the axial direction through the outer current-collecting electrode and the flow directed to the outer electrode through the inner current-collecting electrode.

10. A fuel cell according to claim 1, wherein the current-collecting electrode is made of a porous material selected from the group consisting of nickel, stainless steel and a nickel-based alloy.

* * * * *